US009652375B2

(12) United States Patent
Stark et al.

(10) Patent No.: US 9,652,375 B2
(45) Date of Patent: May 16, 2017

(54) MULTIPLE CHUNK SUPPORT FOR MEMORY CORRUPTION DETECTION ARCHITECTURES

(71) Applicant: Intel Corporation, Santa Clara, CA (US)

(72) Inventors: Tomer Stark, Nesher (IL); Ron Gabor, Hertzliya (IL); Joseph Nuzman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 14/746,702

(22) Filed: Jun. 22, 2015

(65) Prior Publication Data

US 2016/0371179 A1   Dec. 22, 2016

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 12/02* | (2006.01) | |
| *G06F 11/07* | (2006.01) | |
| *G06F 11/10* | (2006.01) | |

(52) U.S. Cl.
CPC ........ *G06F 12/023* (2013.01); *G06F 11/0775* (2013.01); *G06F 11/1004* (2013.01); *G06F 2212/1044* (2013.01)

(58) Field of Classification Search
CPC ............. G06F 11/1004; G06F 11/1048; G06F 11/1064; G06F 11/0751; G06F 11/0763; G06F 11/0775; G06F 12/023; G06F 12/0246; G06F 2212/1044

USPC ........ 711/170, 173, 206, 208, 221; 714/807
See application file for complete search history.

(56) References Cited

U.S. PATENT DOCUMENTS

| | | | |
|---|---|---|---|
| 7,930,491 B1 | 4/2011 | Xu et al. | |
| 2009/0249289 A1* | 10/2009 | Akritidis | G06F 11/3612 717/108 |
| 2011/0173399 A1 | 7/2011 | Chen et al. | |
| 2012/0131257 A1 | 5/2012 | Rudosky et al. | |
| 2013/0173954 A1 | 7/2013 | Woo et al. | |
| 2014/0115283 A1 | 4/2014 | Radovic et al. | |
| 2014/0122826 A1 | 5/2014 | Jacob et al. | |

(Continued)

FOREIGN PATENT DOCUMENTS

EP    0652515 A1    5/1995

OTHER PUBLICATIONS

International Search Report and Written Opinion for International Patent Application No. PCT/US2016/014180, mailed Jul. 11, 2016, 15 pages.

*Primary Examiner* — Yaima Rigol
*Assistant Examiner* — Shane Woolwine
(74) *Attorney, Agent, or Firm* — Lowenstein Sandler LLP

(57) ABSTRACT

Memory corruption detection technologies are described. An example processing system includes a processing core including a register to store an address of a memory corruption detection (MCD) table. The processing core can allocate a memory block of pre-determined size and can allocate a plurality of buffers within the memory block using a memory metadata word stored in an entry of the MCD table. The memory metadata word can include metadata that can identify a first bit range within the memory block for a first buffer and a second bit range within the memory block for a second buffer.

20 Claims, 14 Drawing Sheets

(56) References Cited

U.S. PATENT DOCUMENTS

2014/0281336 A1* 9/2014 Solihin ............... G06F 12/023
 711/170
2015/0127972 A1* 5/2015 Chun ................. G06F 11/1008
 714/6.13

* cited by examiner

MULTIPLE CHUNK SUPPORT FOR MEMORY CORRUPTION DETECTION ARCHITECTURES

BACKGROUND

Memory corruption may be caused, for example, by an out-of-bound access (e.g., memory access using the base address of a memory buffer and an offset that exceeds the allocated size of the buffer) or by a dangling pointer (i.e., a pointer which referenced a memory buffer that has been de-allocated).

DESCRIPTION OF EMBODIMENTS

Memory corruption can occur when the contents of a memory location are accessed. The contents in the memory location can be unintentionally accessed because of programming errors or intentionally modified because of a malicious attack. There can be a variety of causes of memory corruption. One cause of memory corruption can be a coding error, where an application erroneously writes into or reads from unintended memory blocks of a system memory. Another cause of memory corruption can be when an application uses a dangling pointer (i.e., a pointer which references a memory buffer that has been de-allocated). Another cause of memory corruption can be when an application attempts an out-of-bound access (e.g., memory access using the base address of a memory buffer and an offset that exceeds the allocated size of the buffer). A variety of other causes of memory corruption may exist.

Embodiments described herein may address the above noted deficiencies by using a processing system to allocate a plurality of buffers to a memory block of a fixed or pre-determined size. In one example, the processing system may maintain a metadata table to store a metadata word associated with a memory block of a pre-determined size of 64 bytes. The memory block of 64 bytes may be called to store a relatively small object of 32 bytes or less. The processor may allocate the 32 byte object to the fixed size memory block. Instead of reserving the entire 64 byte capacity of the fixed memory, the processor may generate a metadata word associated with the memory block. The metadata word may have an indicator bit used to indicate a multiple chunk support state. If the indicator bit is set to a value of "1," the memory is multiple chunk support enabled. If the indicator bit of the metadata word is set to a value of "0," the multiple chunk support is disabled. If enabled, the processor may associate a second relatively smaller object (for example, a 16 byte object) to the same memory block with the 32 byte object. Each object may be given a specific identifier such as a color determined by a portion of the metadata associated with memory block and the objects stored therein. This identifier may be used to verify an access attempt by an application. The scope of the disclosure is not limited to 64 bytes, and the previous example is intended to provide one exemplary embodiment of the processing system. One advantage of allocating a plurality of buffers to a memory block of a fixed or pre-determined size can be to avoid or prevent memory corruption. Another advantage of allocating a plurality of buffers to a memory block of a fixed or pre-determined size can be to improving memory efficiency with relatively small objects.

Figure 1:
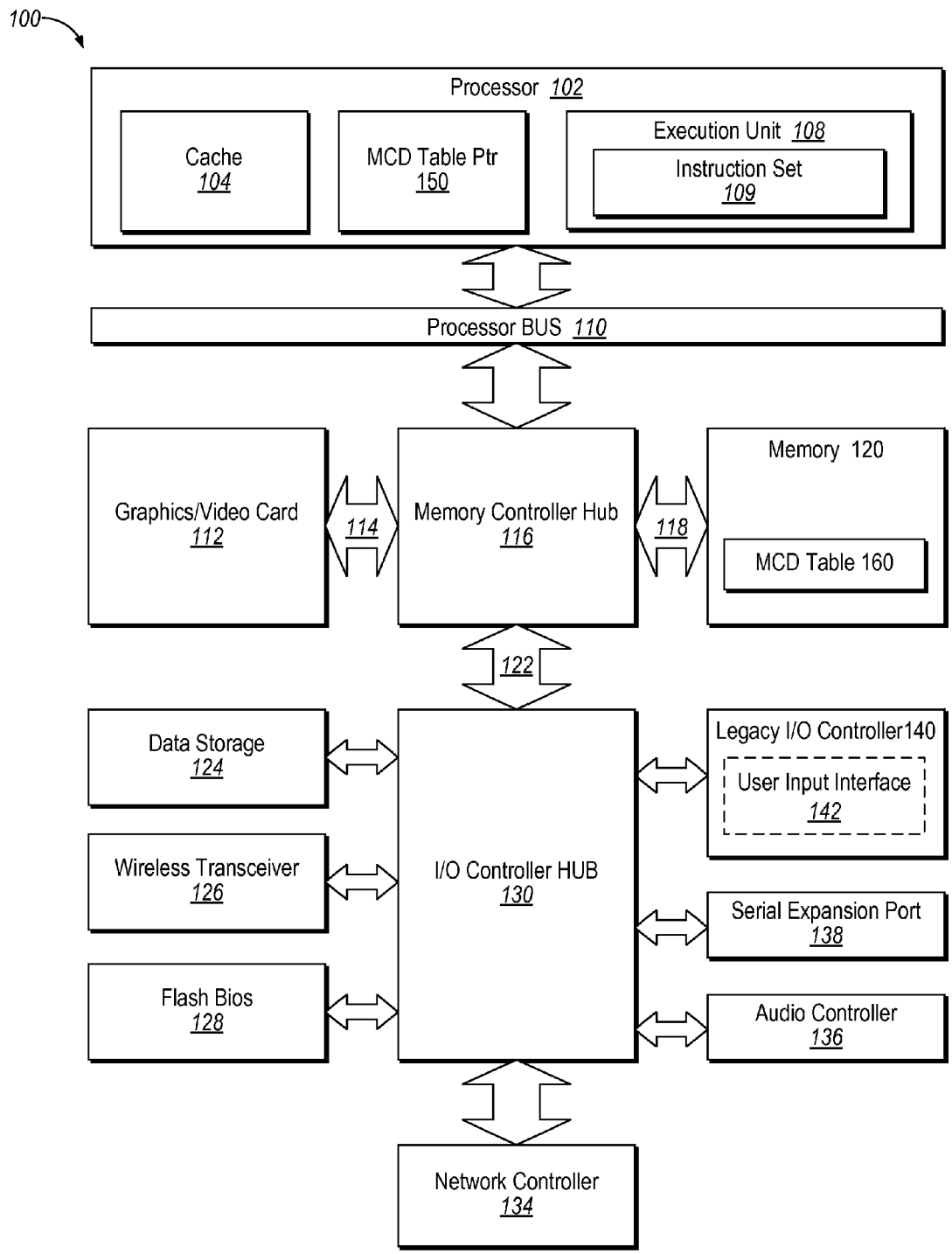
FIG. 1 depicts a high-level component diagram of an example processing system according to one implementation.

Referring to FIG. 1, shown is a high-level component diagram of an example processing system according to one implementation. As shown in FIG. 1, processing system 100 may include one or more processors 102 to employ execution units including logic to perform one or more methods described herein.

In one example, processor 102 includes one or more execution units 108 configured to perform instructions of a certain instruction set. Processor 102 is coupled to a processor bus 110 that transmits data signals between processor 102 and other components in the system 100. Other elements of system 100 (e.g. graphics accelerator 112, memory controller hub 116, memory 120, I/O controller hub 130, wireless transceiver 126, flash BIOS 128, network controller 134, audio controller 136, serial expansion port 138, I/O controller 140, etc.) may perform their conventional functions that are well known to those familiar with the art.

Each processor 102 may comprise a plurality of registers, including general purpose registers and specialized registers. In certain implementations, processing system 100 may also include various other components not shown in FIG. 1. More detailed description of various components of processing system 100 is presented herein below.

Software applications being executed by processing system 100 may reference memory location using virtual addresses (e.g., represented by linear addresses in the linear address space). In accordance with one or more aspects of the present disclosure, processing system 100 may, before translating the referenced linear address to a physical address, validate the pointer specified by the memory access instruction, as described in more detail below.

In certain implementations, processing system 100 may maintain a software-managed metadata table (hereinafter referred to as "MCD table"). MCD table 160 may reside in memory 120 and may be employed to store an identifier for each memory block of a plurality of memory blocks of a pre-defined size (e.g., 64 bytes, although the scope of this disclosure is not limited to any particular memory block size).

Referring again to FIG. 1, each processor 102 may comprise a register 150 (hereinafter referred to as "MCD table pointer") to store the base address of MCD table 160.

Figure 2:
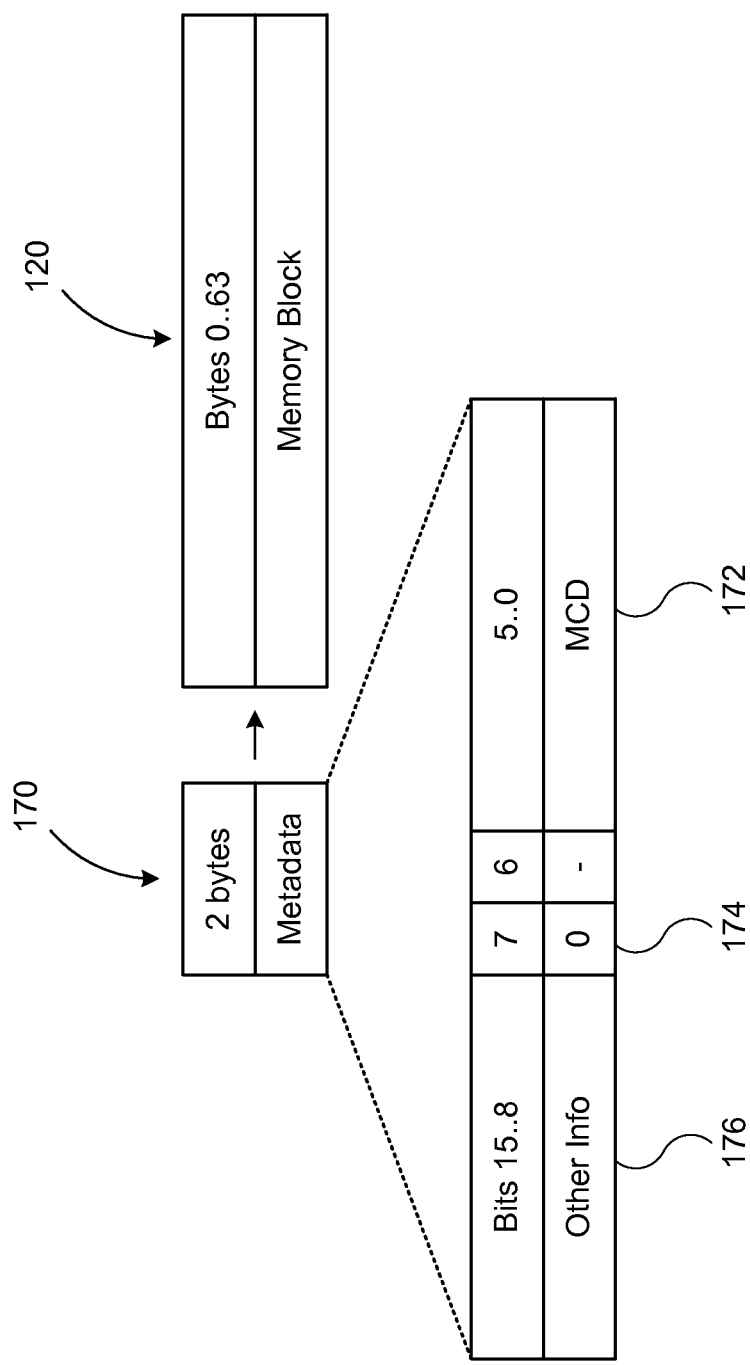
FIG. 2 depicts a schematic diagram of one embodiment of a metadata word associated with a memory block according to one implementation.

FIG. 2 depicts a schematic diagram of one embodiment of a metadata word or MCD identifier associated with a memory block according to one implementation. When a portion of memory is allocated to a new object (e.g., by calloc, malloc, or realloc routine), the memory allocation routine may generate an identifier to be associated with the memory block where the object is assigned. The identifier may be stored in one or more metadata table (MCD table) entries that correspond to the memory blocks to be allocated to the object. The generated metadata word (MCD identifier), or a value derived from it, may also be used by a pointer that is returned by the memory allocation routine to the application that has requested the memory allocation. This identifier or MCD metadata word in the pointer may be used for MCD comparison to the corresponding metadata table entry (as described in more details herein below), and will be ignored for the purpose of the memory addressing (the actual memory load or store).

The metadata may include an indicator bit to indicate a status of multiple chunk support. If the indicator is set to enable multiple chunk support, multiple objects may be stored in multiple "chunks" of the memory. This is particularly advantageous in situations where the objects handled are small relative to the allocated memory blocks.

As schematically illustrated by FIG. 2, a memory block 120 may have an associated metadata identifier or metadata word 170 stored in the MCD table 160. In the illustrated embodiment, the memory block 120 has a pre-determined size of 64 bytes (shown as bit positions 0 . . . 63). The metadata word 170 is stored in the MCD table 160 and associated with the memory block 120. In the illustrated embodiment, the metadata word 170 includes an MCD portion 172. The depicted embodiment of the MCD portion 172 is 6 bits. The MCD portion 172 may be called to verify an access request. The memory block 120 may be the target of a memory access request by an application.

Responsive to receiving a memory access request for the memory block 120, the processing system 100 may extract an MCD identifier from the pointer specified by the memory access request, as described in more details herein below. Processing system 100 may then retrieve an MCD portion 172 stored in MCD table 160. Should the two MCD data conflict, a fault, error, alert, or other communication or response may be generated.

The illustrated embodiment of the metadata word 170 includes an indicator bit 174. The indicator bit 174 is shown as a single bit stored at the location of the seventh bit. Embodiments of the indicator bit 174 may be at different locations within the MCD metadata word 170. The indicator bit 174 enables or disables multiple chunk support for the memory block 120. If the indicator bit 174 is set to a value of "1," multiple chunk support may be enabled and allow for multiple objects to be stored in the memory block 120. If the indicator bit 174 is set to a value of "0," multiple chunk support may be disabled and allow for a single object to be stored in the memory block 120. If the object to be saved is relatively large, it may require all, almost all, or more than all of the allocated memory block 120. In this situation, the indicator 174 may be set to disable multiple chunk support. If the object stored to the memory block 120 is relatively small compared to the memory block 120, the indicator 174 may enable multiple chunk support to allow a second object to be stored within the memory 120. This may improve memory overhead and efficiency in allocation of small objects.

The metadata 170 may include an MCD value 172. In the illustrative examples described herein, the granularity of memory 120 to which the MCD value 172 is assigned (i.e., the size of memory block 120) may be 64 bytes. The size of the MCD value 172 of the metadata word 170 may be 6 bits. While the illustrative examples described herein assume the above referenced memory block size and MCD value size, the scope of the present disclosure is not limited to these values. In various other implementations, other values of memory block size and/or MCD value size may be employed.

The metadata 170 may also include other info 176. The other info 176 may be 8 bits in length. The other info 176 may correspond with byte level granularity detection to detect single byte buffer overflow. The other info portion 176 may be used for tracking or recording other types of information. In some embodiments, bit six of the metadata word 170 may be left reserved.

On application startup, the application (or a runtime library) may, in addition to requesting a memory to be allocated for the objects heap and general software usage, further request a memory to be allocated for the MCD table 160.

Figure 3:
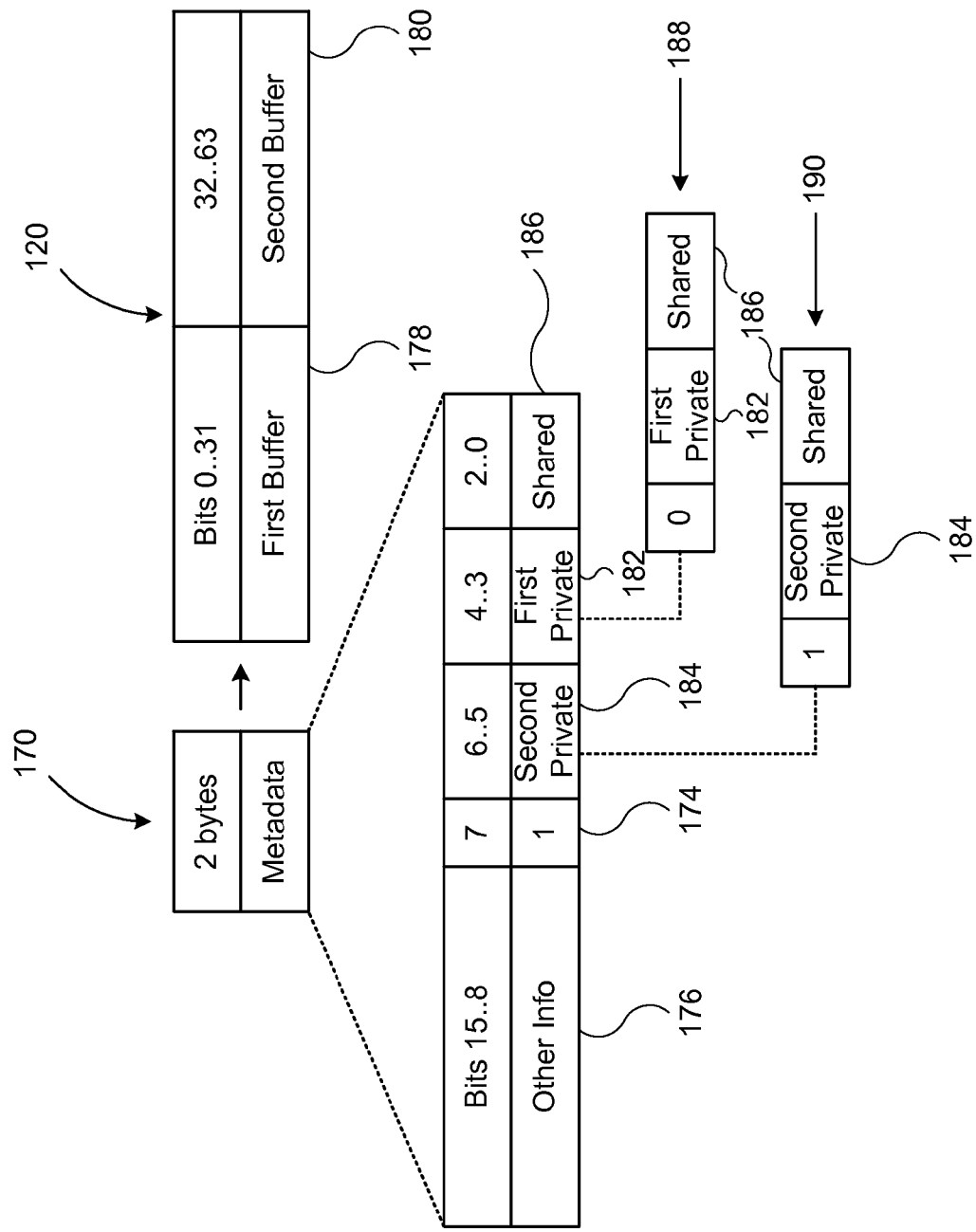
FIG. 3 depicts a schematic diagram of another embodiment of a metadata word associated with a memory block with multiple chunk support enabled in according to one implementation.

FIG. 3 depicts a schematic diagram of another embodiment of a metadata word 170 associated with the memory block 120 with multiple chunk support enabled according to one implementation. The illustrated embodiment depicts the structure of the metadata word 170 with the multiple chunk support enabled by setting the indicator bit 174 to "1." Multiple chunk support allows the memory block 120 to be separated into a first buffer 178 and a second buffer 180. Each of the first buffer 178 and second buffer 180 may be assigned an object that fits within the corresponding portions of the memory block 120.

With multiple chunk support enabled, the metadata word 170 includes a first private portion 182 and a second private portion 184. The first private portion 182 corresponds to the first buffer 178. Each of the first and second buffers 178 and 180 are protected by a color or value. The color or value for the first buffer 178 is derived from a first combination 188 of components from the metadata word. In the illustrated embodiment, the first combination 188 may include a first bit set to "0" as part of its value. The first bit of the first combination 188 may be set to "0" by default or as a consequence of the state of the indicator bit 174. The first combination 188 also takes in the first private portion 182 and a shared portion 186. The shared portion 186 may be a three bit segment carried by both the first combination 188 and the second combination 190. The portions of the first combination 188 may have an order different from that depicted in FIG. 3.

The color or value for the second buffer 180 is determined based on the second combination 190. In the illustrated embodiment, the second combination 190 may include a first bit set to "1" as part of its value. The first bit of the second combination 190 may be set to "1" in response to the state of the indicator bit 174, as an incremental change relative to the first combination 188, or simply by default. The second combination also 190 takes in the second private portion 184 and a shared portion 186. Calculation of the colors or values is described below with reference to FIG. 4. The portions of the second combination 190 may have an order different from that depicted in FIG. 3. The preceding paragraphs provide exemplary embodiments and are not intended to be limiting. In other embodiment, only the shared portion or only the private portion may be used, e.g., instead of the combination thereof.

Figure 4:
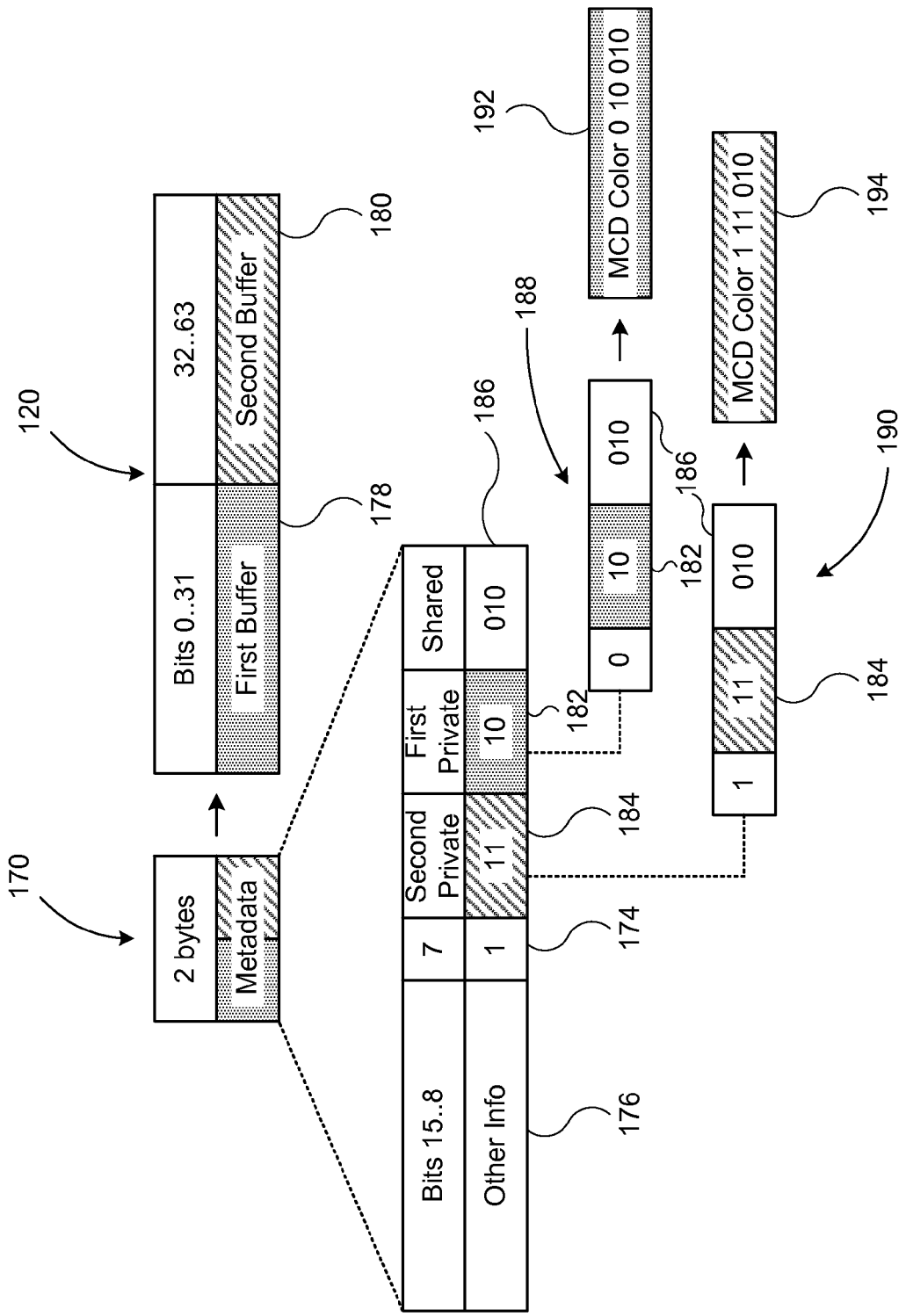
FIG. 4 depicts a schematic diagram of another embodiment of a metadata word associated with a memory block with multiple chunk support enabled and Memory Corruption Detection (MCD) colors illustrated according to one implementation.

FIG. 4 depicts a schematic diagram of another embodiment of a metadata word 170 associated with a memory block 120 with multiple chunk support enabled and Memory Corruption Detection (MCD) colors 192 and 194 illustrated according to one implementation. As described above, the first and second combinations 188 and 190 may be generated based on portions of the metadata word 170. In the illustrated embodiment, the first MCD color 192 is associated with the first combination 188 which is calculated based on the bit values of the first combination 188. In the illustrated embodiment, the first bit for the first combination 188 is set to "0" with the bits in the first private portion 182 set to "1 0" and the bits of the shared portion set to "0 1 0." These values may be concatenated to form the bit order of "0 10 010" the first MCD color 192. The bit order of "0 10 010" in the first MCD color 192 may correspond to a specific color such as 0x12. This color or metadata of 0x12 may be implemented to protect the first buffer 178 in the memory block 120.

Similarly, in the illustrated embodiment, the second MCD color 194 is associated with the second combination 190 which is calculated based on the bit values of the second combination 190. In the illustrated embodiment, the first bit for the second combination 190 is set to "1" with the bits in the second private portion 184 set to "1 1" and the bits of the shared portion set to "0 1 0." These values may be concatenated to form the bit order of "1 11 010" for the second MCD color 194. The bit order of "1 11 010" in the second MCD color 194 may correspond to a specific color such as 0x3a. Similar to the first buffer 178, this color or metadata of 0x3a in the second MCD color 194 may be implemented to protect the second buffer 180 in the memory block 120. Other orders of concatenation may be implemented. Additionally, other colors or motifs may be used to identify the protection for the first and second buffers 178 and 180.

As described above, the system allows for correlation of different metadata or colors for each of the first and second buffers 178 and 180. This correlation provides protection for the first and second buffers 178 and 180, as described in greater detail below with reference to FIG. 5. In some embodiments, the correlation of the color metadata to the buffers is such that one of the colors may be changed for one of the buffers without affecting the other buffer within the same memory block. For example, the color associated with the first buffer 178 in the memory block 120 may be changed without affecting the color of the second buffer 180 even though both the first buffer 178 and the second buffer 180 reside within the same memory block 120. The independence of the colors allows for protection of each buffer to be independent of the protection of the other. This is particularly useful when a buffer is freed or de-allocated as each buffer or chunk of memory may be freed or de-allocated and reassigned independently without having to affect the state of another buffer in the same memory block.

Figure 5:
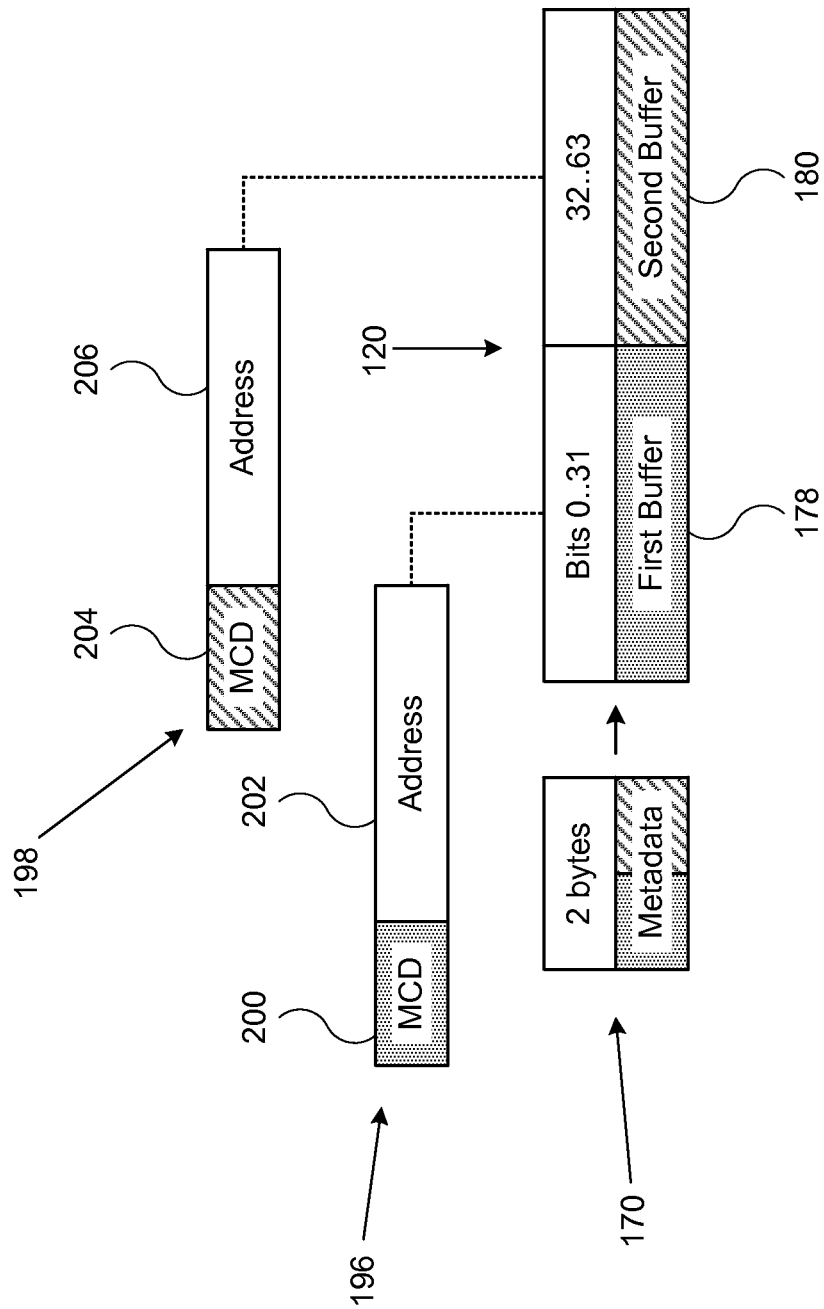
FIG. 5 depicts a schematic diagram of another embodiment of a metadata word with the associated memory block with pointers attempting access to the memory block according to one implementation.

FIG. 5 depicts a schematic diagram of another embodiment of a metadata word 170 with the associated memory block 120 with pointers 196 and 198 attempting access to the memory block 120 according to one implementation. The illustrated embodiment shows a first pointer 196 which points to the first buffer 178 of the memory block 120. The first pointer 196 may be called by an application requesting access to the first buffer 178 of the memory block 120 or specifically to an object stored in the first buffer 178 in the memory block 120. The second pointer 198 may be used in a similar manner.

In the illustrated embodiment, the first pointer 196 may include the MCD metadata or color 200 as well as an address portion 202. The address portion of the pointer is discussed in greater detail below with respect to FIG. 6. In response to a call of the first pointer 196 for access to the first buffer 178, the MCD color 200 may be checked against the corresponding portion of the metadata word 170. If the MCD color 200 of the first pointer matches the color of the metadata word 170 corresponding to the first buffer 178, the request is granted and access is allowed. If, for example, the second pointer 198 pointed to the first buffer 178, it would be detected that the MCD color 204 of the does not match the color of the metadata word 170 corresponding to the first buffer 178. A determination that the pointer and buffer metadata does not match would result in a fault, error, or other refusal of access.

Figure 6:
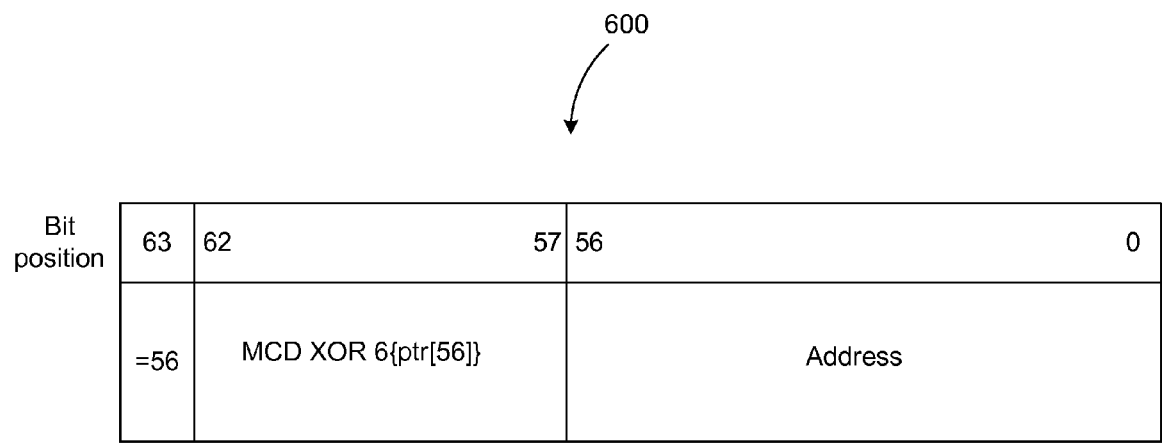
FIG. 6 schematically illustrates an example pointer structure that may be employed by a method for memory corruption detection according to one implementation.

FIG. 6 schematically illustrates an example pointer structure 600 that may be employed by a method of memory corruption detection according to one implementation. In the illustrative example of FIG. 6, the address space may employ linear 57-bit addresses. Thus, for a canonical pointer, bits 57 . . . 63 are all copies of bit 56.

When memory corruption detection is enabled, the MCD identifier value may be XOR'ed into the upper bits of the pointer, so that MCD identifier=ptr[62:57] XOR 6{ptr[56]}, wherein ptr[62:57] denotes bits 57 . . . 62 of the pointer to the memory buffer being allocated, 6{ptr[56]} denotes 6 bits having the value of bit 56 of the pointer, and XOR denotes the logical operation of exclusive disjunction.

Hence, pointer structure 600 of FIG. 6 may include the following portions: bits 0 . . . 56 containing the address (such as a linear address) of the buffer being allocated in a memory block; bits 57 . . . 62 comprising a value derived from the MCD identifier assigned to the memory buffer being allocated; and bit 63 being a copy of bit 56.

While in the illustrative example of FIG. 6, the value stored in bits 57 . . . 62 may be determined as the result produced by applying the exclusive disjunction operation to the MCD identifier assigned to the buffer being allocated and 6 bits having the value of bit 56 of the pointer, the scope of the present disclosure is not limited to this example. In various other implementations, other methods of associating the MCD identifier value with the pointer referencing the buffer being allocated may be employed for implementing the systems and methods described herein.

While the illustrative examples described herein assume the 57-bit address space, the scope of the present disclosure is not limited to this address size. In various other implementations, other address sizes may be employed for implementing the systems and methods described herein. Also, other designations of the pointer bits as bits denoting address and bits denoting metadata may be employed.

Figure 7:
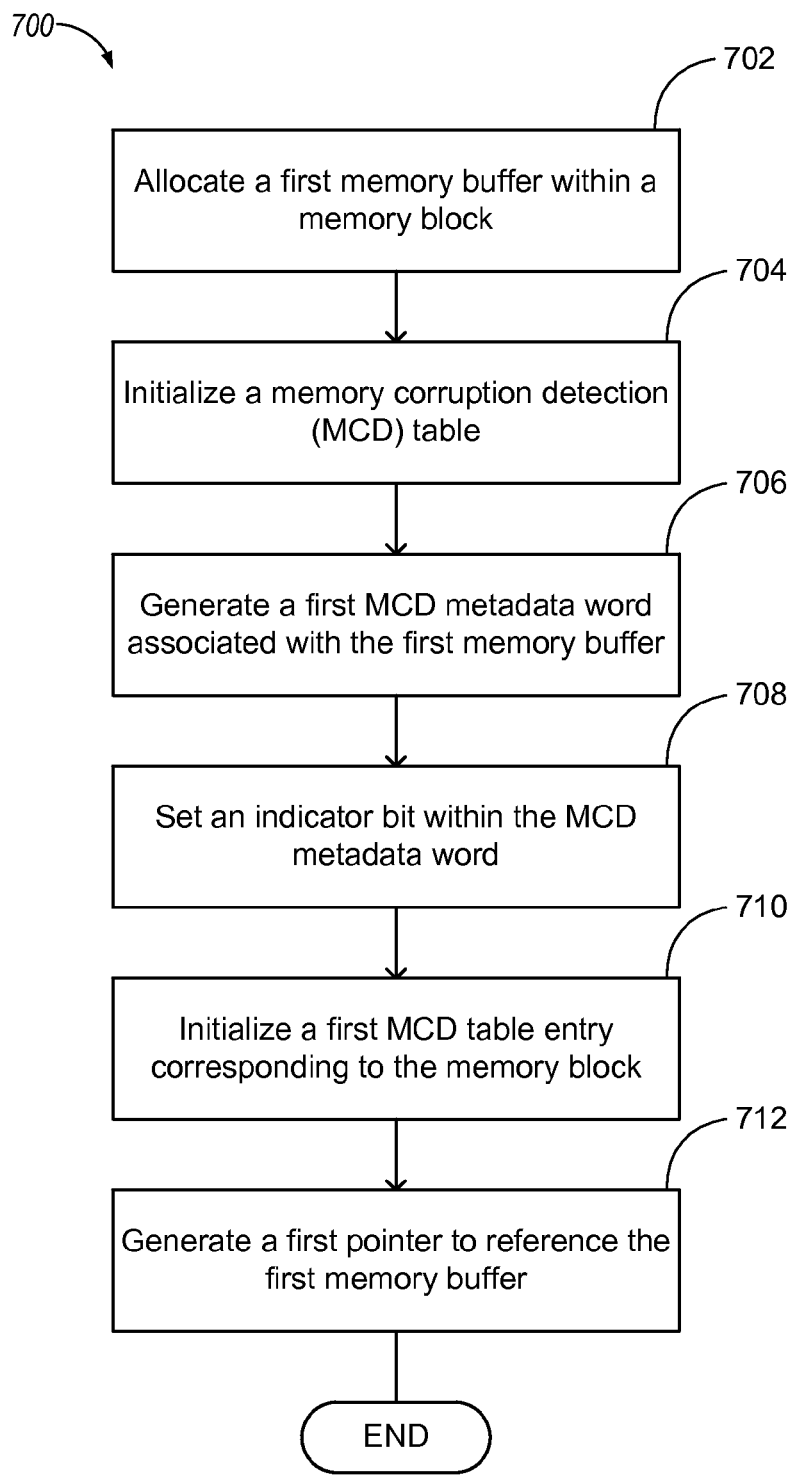
FIG. 7 depicts a flow diagram of an example method for memory allocation according to one implementation.

FIG. 7 depicts a flow diagram of an example method for memory allocation according to one implementation. Method 700 may be performed by a computer system that may comprise hardware (e.g., circuitry, dedicated logic, and/or programmable logic), software (e.g., instructions executable on a computer system to perform hardware simulation), or a combination thereof. Method 700 and/or each of its functions, routines, subroutines, or operations may be performed by one or more physical processors of the computer system executing the method. Two or more functions, routines, subroutines, or operations of method 700 may be performed in parallel or in an order which may differ from the order described above. In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other. In one example, as illustrated by FIG. 7, method 700 may be performed by the processing systems described herein below and illustrated by FIGS. 9-14.

At block 702, a first memory buffer is allocated within a memory block of pre-determined size. The processing device allocating the first memory buffer (e.g., calloc, malloc, or realloc routine) may allocate a memory buffer of a specific size, rounded up to the nearest multiple of the granularity of the MCD value generated and assigned to the first memory buffer, at block 706. The memory block may be a block of 64 bytes or some other size. The first memory buffer may be of 32 bytes or some other size.

At block 704, a memory corruption table (MCD) is initialized. The MCD table may be initialized by allocating a portion of memory to the table. The table may include locations for entries associated with one or more blocks of memory. A first MCD metadata word is generated at block 706. The first MCD metadata word is associated with the first memory buffer. An indicator bit is set, at block 708, within the MCD metadata word. The indicator bit indicates a multiple chunk support state of the memory block. For example, if a metadata word has an indicator bit=0, the associated memory block is not enabled for multiple chunk support and a memory buffer stored to the memory block is aligned to a certain position within the memory block. That position may be at the zero bit of the memory block. If the indicator bit for a metadata word=1, the associated memory block is enabled for multiple chunk support and the memory buffer corresponding to the metadata word with the indicator bit=1 is aligned to a different bit number within the memory block. Other embodiments may incorporate other structures for handling different multiple chunk support states.

At block 710, a first MCD table entry corresponding to the memory block is initialized based on the MCD metadata word generated in block 706. A processing device may store the initialized MCD metadata word in the MCD table at an offset corresponding to a memory block of pre-defined size (e.g., 64 bytes). In an illustrative example the MCD identifier corresponding to linear address X may be located within the MCD table byte at MCD_Table[X/64], wherein MCD_Table is the base address of the MCD table.

At block 712, a processing device may generate a first pointer to reference the first memory buffer. The pointer may include a bit sequence derived from the MCD metadata word. The bit sequence may be stored at a pre-defined location within the first pointer. A processing device may store the MCD metadata word, or a value derived from it, in one or more bits (e.g., upper bits) of a pointer referencing the memory buffer being allocated. In certain implementations, the processing device may employ the exclusive disjunction (XOR) operation for storing the MCD metadata word in the upper bits of the pointer.

In various illustrative examples, implementing the above described method of memory allocation with MCD multiple chunk support would only require modifications to the memory allocation routine, while not requiring any modifications to the compiler and the application. Validating the pointers produced by memory access instructions of an application may be implemented by a processing system, as described in more detail herein below with reference to FIG. 8.

Figure 8:
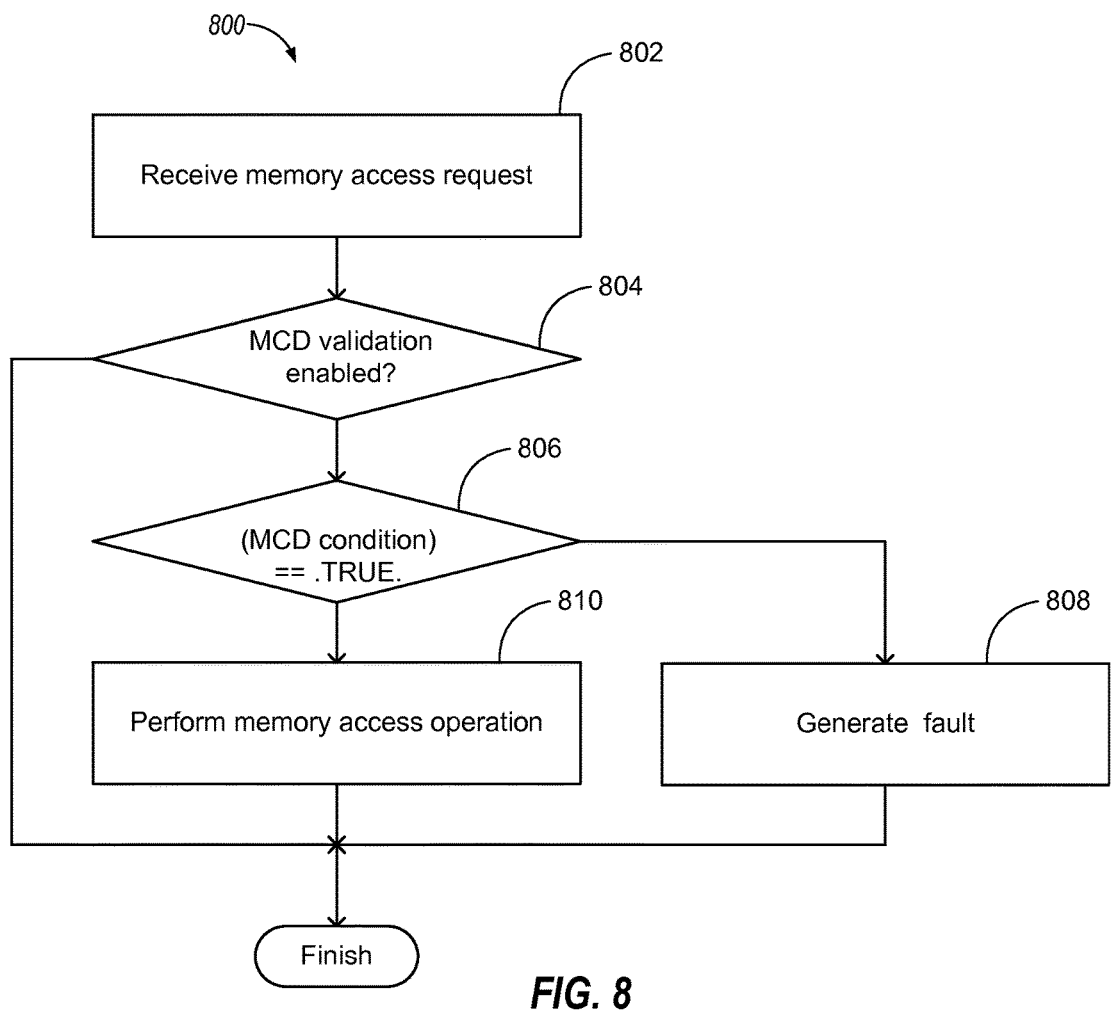
FIG. 8 depicts a flow diagram of an example method for validating a pointer referenced by a memory access instruction according to one implementation.

FIG. 8 depicts a flow diagram of an example method for validating a pointer referenced by a memory access instruction according to one implementation. Method 800 may be performed by a computer system that may comprise hardware (e.g., circuitry, dedicated logic, and/or programmable logic), software (e.g., instructions executable on a computer system to perform hardware simulation), or a combination thereof. Method 800 and/or each of its functions, routines, subroutines, or operations may be performed by one or more physical processors of the computer system executing the method. Two or more functions, routines, subroutines, or operations of method 800 may be performed in parallel or in an order which may differ from the order described above. In certain implementations, method 800 may be performed by a single processing thread. Alternatively, method 800 may be performed by two or more processing threads, each thread executing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other. In one example, as illustrated by FIG. 8, method 800 may be performed by the processing systems described herein below and illustrated by FIGS. 9-14.

Responsive to receiving, at block 802, a memory access request, the processing device implementing the method may proceed to block 804.

Responsive to determining, at block 804, that MCD validation should be performed with respect to the pointer referenced by the memory allocation request, the processing may continue at block 806; otherwise, the method may branch to block 808.

The processing system may be configured to evaluate one or more conditions in order to determine whether an MCD validation should be performed with respect to a pointer. In certain implementations, the processing system may determine whether the MCD validation is enabled for the current application by, for example, inspecting the metadata word of the MCD table pointer. Should the MCD table pointer contain a valid address, the MCD validation for the application is presumed to be enabled. Otherwise (e.g., if the MCD table pointer contains a zero address), the MCD validation for the application is presumed to be disabled.

In certain implementations, the processing system may further determine whether the requested memory access operation references a pointer to a user memory page. If so, the MCD validation of the pointer is presumed to be enabled. Otherwise (e.g., if the pointer references a privileged page), the MCD validation of the pointer is presumed to be disabled or may be performed using a separate MCD table (e.g., an optional supervisor/OS MCD table).

In certain implementations, the processing system may further determine whether the memory page that is being accessed is marked for MCD validation in the page table (PT). In an illustrative example, memory pages may be marked for MCD validation by a protection key (PK) referenced by the corresponding page table entry (PTE). Page marking for MCD validation may be performed as a performance optimization measure, and may be enabled or disabled by the operating system (e.g., by setting or clearing a pre-defined CR4 bit).

In certain implementations, the processing system may further determine whether the pointer is in the canonical form (e.g., whether bits 57 . . . 63 are all copies of bit 56). Responsive to determining that the pointer is in the canonical form, MCD validation of the pointer may be omitted; otherwise, MCD validation of the pointer may be performed.

At block 806, the processing system may perform MCD validation of the pointer, by comparing the MCD information retrieved from the MCD table to the MCD information extracted from the pointer specified by the memory access instruction. In some embodiments, the MCD information or metadata word stored in the MCD table may have a single piece of MCD information corresponding to a single buffer within the memory block. In another embodiment, the MCD table entry may include multiple pieces of MCD metadata word information. For example, if multiple chunk support is enabled, the processing system may validate the MCD information of the pointer against one of two separate MCD portions of the table entry. An access request for a first buffer within the memory block may be checked against the portion of the table entry pertaining to the first buffer. If the MCD portion of the pointer does not match the MCD portion of the table entry, the process proceeds to generate a fault at block 808

Should the MCD condition be evaluated as true, the memory access operation may proceed at block 810, and the method may terminate; otherwise a fault may be generated at block 808, and the method may terminate.

The systems and methods described herein perform memory corruption detection. Although various systems and methods are described herein with reference to specific integrated circuits, such as processors, other implementations may be applicable to other types of integrated circuits and logic devices. Techniques and teachings of systems and methods described herein may be applied to other types of circuits or semiconductor devices that may also benefit from better energy efficiency and energy conservation. For example, the disclosed implementations are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications may include a microcontroller, a digital signal processor (DSP), network computers (NetPC), set-top boxes, network hubs, wide area network (WAN) switches, or any other system that can perform the functions and operations taught below. Moreover, the systems and methods described herein are not limited to physical computing devices, but may also relate to software-implemented methods. Power savings realized by systems and methods described herein may be independent of and complementary to an operating system (OS)-based mechanism, such as the Advanced Configuration and Platform Interface (ACPI) standard.

The methods and systems described herein above may be implemented by computer system of various architectures, designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable to implement the methods described herein. In general, a large variety of systems or electronic devices capable of incorporating a processor and/or other execution logic as disclosed herein are generally suitable for implementing the systems and methods described herein.

Presented below is a more detailed description of example processing systems that may implement one or more systems of methods for memory corruption detection in accordance with one or more aspects of the present disclosure.

Referring again to FIG. 1, processor 102 may include a Level 1 (L1) internal cache memory 104. Depending on the architecture, processor 102 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in processor 102. Processor 102, in certain implementations, includes a microcode ROM to store microcode, which when executed, is to perform algorithms for certain macroinstructions or handle complex scenarios. Here, microcode is potentially updateable to handle logic bugs/fixes for processor 102. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate implementations of an execution unit 108 may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by processor 102.

A system logic chip 116 is coupled to the processor bus 110 and memory 120. The system logic chip 116 in the illustrated embodiment is a memory controller hub (MCH). Processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

Figure 9:
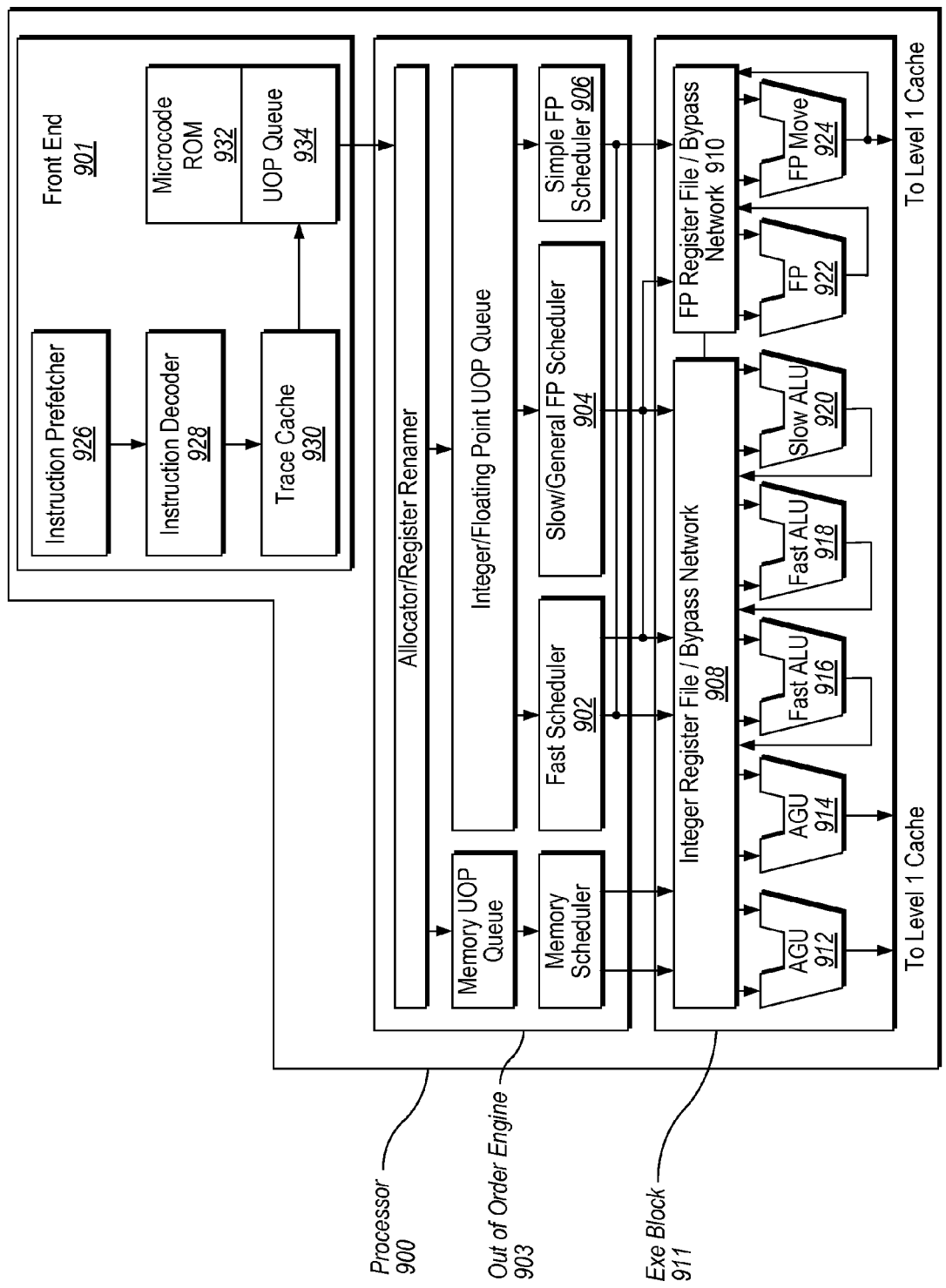
FIG. 9 depicts a block diagram of a processor according to one implementation.

FIG. 9 is a block diagram of the micro-architecture for a processor 900 that includes logic circuits to perform instructions according to one implementation. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 901 is the part of the processor 900 that fetches instructions to be executed and prepares them to be used later in the processor pipeline. The front end 901 may include several units. In one embodiment, the instruction prefetcher 926 fetches instructions from memory and feeds them to an instruction decoder 928 which in turn decodes or interprets them. For example, in certain implementations, the decoder decodes a received instruction into one or more operations called "micro-instructions" or "micro-operations" (also referred to as uops) that the machine can execute. In other embodiments, the decoder parses the instruction into an opcode and corresponding data and control fields that are used by the micro-architecture to perform operations in accordance with one embodiment. In one embodiment, the trace cache 930 takes decoded uops and assembles them into program ordered sequences or traces in the uop queue 934 for execution. When the trace cache 930 encounters a complex instruction, the microcode ROM 932 provides the uops needed to complete the operation.

Some instructions are converted into a single micro-op, whereas others need several micro-ops to complete the full operation. In one embodiment, if more than four micro-ops are needed to complete an instruction, the decoder 928 accesses the microcode ROM 932 to do the instruction. For one embodiment, an instruction can be decoded into a small number of micro ops for processing at the instruction decoder 928. In another embodiment, an instruction can be stored within the microcode ROM 932 should a number of micro-ops be needed to accomplish the operation. The trace cache 930 refers to an entry point programmable logic array (PLA) to determine a correct micro-instruction pointer for reading the micro-code sequences to complete one or more instructions in accordance with one embodiment from the micro-code ROM 932. After the microcode ROM 932 finishes sequencing micro-ops for an instruction, the front end 901 of the machine resumes fetching micro-ops from the trace cache 930.

The out-of-order execution engine 903 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register aliasing logic maps logical registers onto entries in a register file. The allocator also allocates an entry for each uop in one of the two uop queues, one for memory operations and one for non-memory operations, in front of the instruction schedulers: memory scheduler, fast scheduler 902, slow/general floating point scheduler 904, and simple floating point scheduler 906. The uop schedulers 902, 904, 906 determine when a uop is ready to execute based on the readiness of their dependent input register operand sources and the availability of the execution resources the uops need to complete their operation. The fast scheduler 902 of one embodiment can schedule on each half of the main clock cycle while the other schedulers can schedule once per main processor clock cycle. The schedulers arbitrate for the dispatch ports to schedule uops for execution.

Physical register files 908, 910 sit between the schedulers 902, 904, 906, and the execution units 912, 914, 916, 918, 920, 922, 924 in the execution block 911. There is a separate register file 908, 910 for integer and floating point operations, respectively. Each register file 908, 910, of one embodiment also includes a bypass network that can bypass or forward just completed results that have not yet been written into the register file to new dependent uops. The integer register file 908 and the floating point register file 910 are also capable of communicating data with the other. For one embodiment, the integer register file 908 is split into two separate register files, one register file for the low order 32 bits of data and a second register file for the high order 32 bits of data. The floating point register file 910 of one embodiment has 128 bit wide entries because floating point instructions typically have operands from 64 to 128 bits in width.

The execution block 911 contains the execution units 912, 914, 916, 918, 920, 922, 924, where the instructions are actually executed. This section includes the register files 908, 910, that store the integer and floating point data operand values that the micro-instructions need to execute. The processor 900 of one embodiment is comprised of a number of execution units: address generation unit (AGU) 912, AGU 914, fast ALU 916, fast ALU 918, slow ALU 920, floating point ALU 922, floating point move unit 924. For one embodiment, the floating point execution blocks 922, 924, execute floating point, MMX, SIMD, and SSE, or other operations. The floating point ALU 922 of one embodiment includes a 64 bit by 64 bit floating point divider to execute divide, square root, and remainder micro-ops. For systems and methods described herein, instructions involving a floating point value may be handled with the floating point hardware. In one embodiment, the ALU operations go to the high-speed ALU execution units 916, 918. The fast ALUs 916, 918, of one embodiment can execute fast operations with an effective latency of half a clock cycle. For one embodiment, most complex integer operations go to the slow ALU 920 as the slow ALU 920 includes integer execution hardware for long latency type of operations, such as a multiplier, shifts, flag logic, and branch processing. Memory load/store operations are executed by the AGUs 912, 914. For one embodiment, the integer ALUs 916, 918, 920 are described in the context of performing integer operations on 64 bit data operands. In alternative embodiments, the ALUs 916, 918, 920 can be implemented to support a variety of data bits including 16, 32, 128, 256, etc. Similarly, the floating point units 922, 924 can be implemented to support a range of operands having bits of various widths. For one embodiment, the floating point units 922, 924 can operate on 128 bits wide packed data operands in conjunction with SIMD and multimedia instructions.

In one embodiment, the uops schedulers 902, 904, 906 dispatch dependent operations before the parent load has finished executing. As uops are speculatively scheduled and executed in processor 900, the processor 900 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figures 10A, 10B:
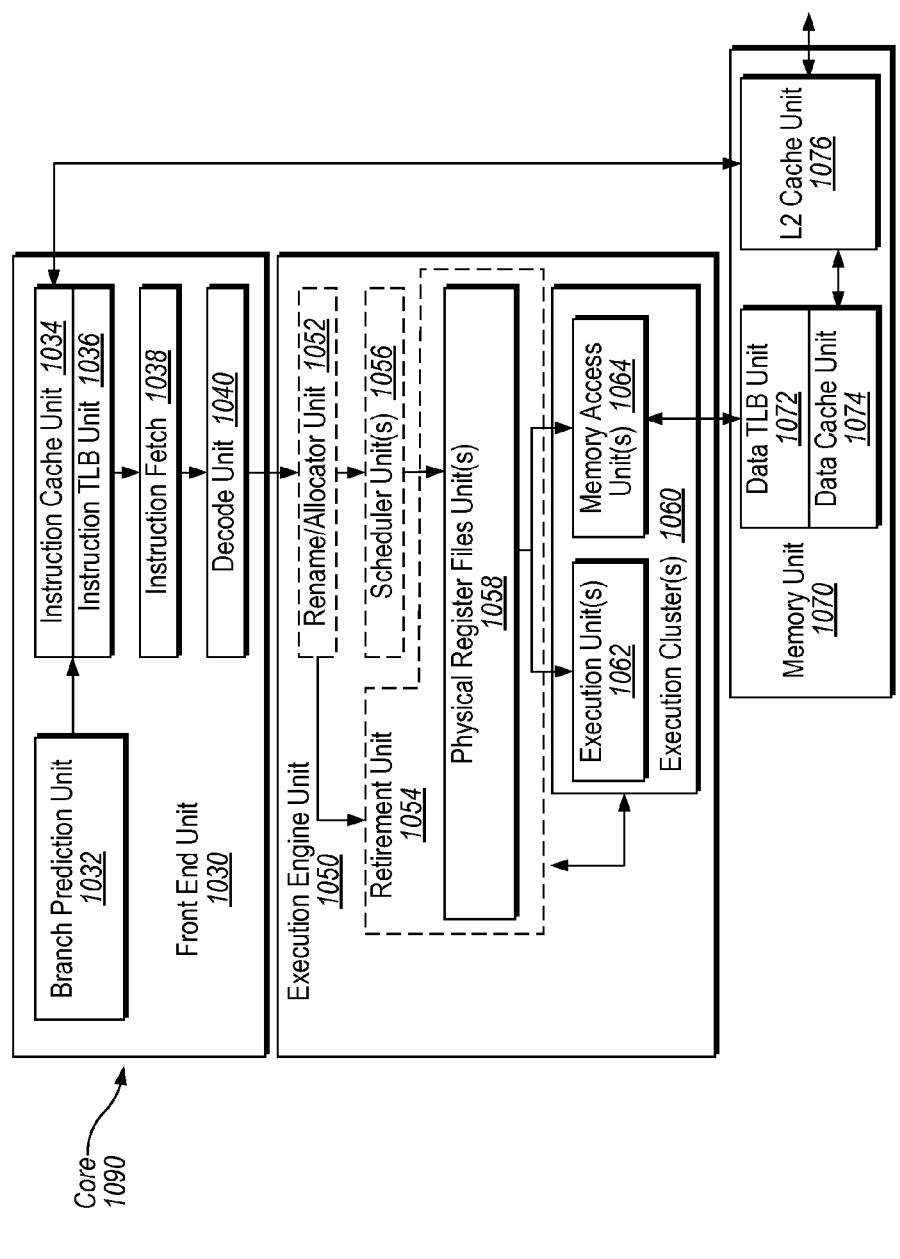
FIGS. 10a and 10b schematically illustrate elements of a processor micro-architecture according to one implementation.

FIGS. 10a and 10b schematically illustrate elements of a processor micro-architecture according to one implementation. In FIG. 10a, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

In FIG. 10b, arrows denote a coupling between two or more units and the direction of the arrow indicates a direction of data flow between those units. FIG. 10b shows processor core 1090 including a front end unit 1030 coupled to an execution engine unit 1050, and both are coupled to a memory unit 1070.

The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 1034 is further coupled to a level 2 (L2) cache unit 1076 in the memory unit 1070. The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1058 is overlapped by the retirement unit 1054 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The L2 cache unit 1076 is coupled to one or more other levels of cache and eventually to a main memory.

By way of example, the exemplary register aliasing, out-of-order issue/execution core architecture may implement the pipeline 1000 as follows: the instruction fetch 1038 performs the fetch and length decoding stages 1002 and 1004; the decode unit 1040 performs the decode stage 1006; the rename/allocator unit 1052 performs the allocation stage 1008 and renaming stage 1010; the scheduler unit(s) 1056 performs the schedule stage 1012; the physical register file(s) unit(s) 1058 and the memory unit 1070 perform the register read/memory read stage 1014; the execution cluster 1060 perform the execute stage 1016; the memory unit 1070 and the physical register file(s) unit(s) 1058 perform the write back/memory write stage 1018; various units may be involved in the exception handling stage 1022; and the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register aliasing is described in the context of out-of-order execution, it should be understood that register aliasing may be used in an in-order architecture. While the illustrated embodiment of the processor also includes a separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

In certain implementations, processor core 1090 may be designed as an out-of-order (OOO) core in order to improve the performance by executing instructions as soon as their operands become available, rather than in the program order. However, the performance benefit may be offset by a considerable increase in the power consumption. When multiple execution threads are available for the operating system to schedule, employing multiple in-order cores rather than large OOO cores may improve the energy consumption profile of the processor without compromising the overall performance. Thus, to improve the performance and energy consumption scalability of a processor, the latter may be designed to support a variable number of cores depending on the performance needs and the number of threads available to the operating system for scheduling.

Figure 11:
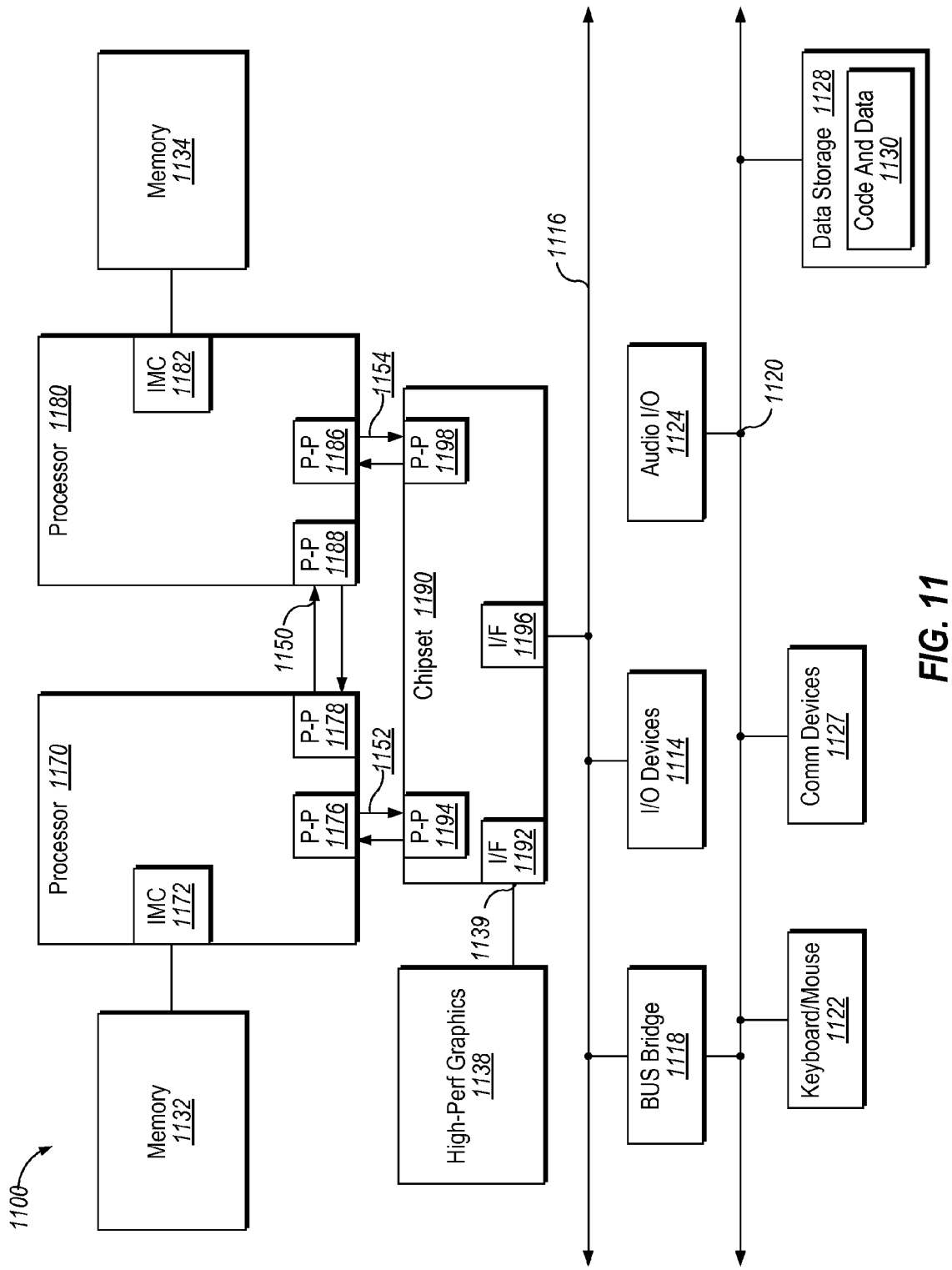
FIG. 11 depicts a block diagram of an example computer system according to one implementation.

FIG. 11 depicts a block diagram of an example computer system 1100 according to one implementation. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of processing system 100 capable of implementing virtual machine-based protected video paths, as described in more details herein above. While shown with only two processors 1170, 1180, it is to be understood that the scope of the present disclosure is not so limited. In other embodiments, one or more additional processors may be present in the example computer system.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 8, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may also exchange information with a high-performance graphics circuit 1138 via a high-performance graphics interface 1139.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 may be coupled to first bus 1116, along with a bus bridge 1118 which couples first bus 1116 to a second bus 1120. In one embodiment, second bus 1120 may be a low pin count (LPC) bus. Various devices may be coupled to second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to second bus 1120.

Figure 12:
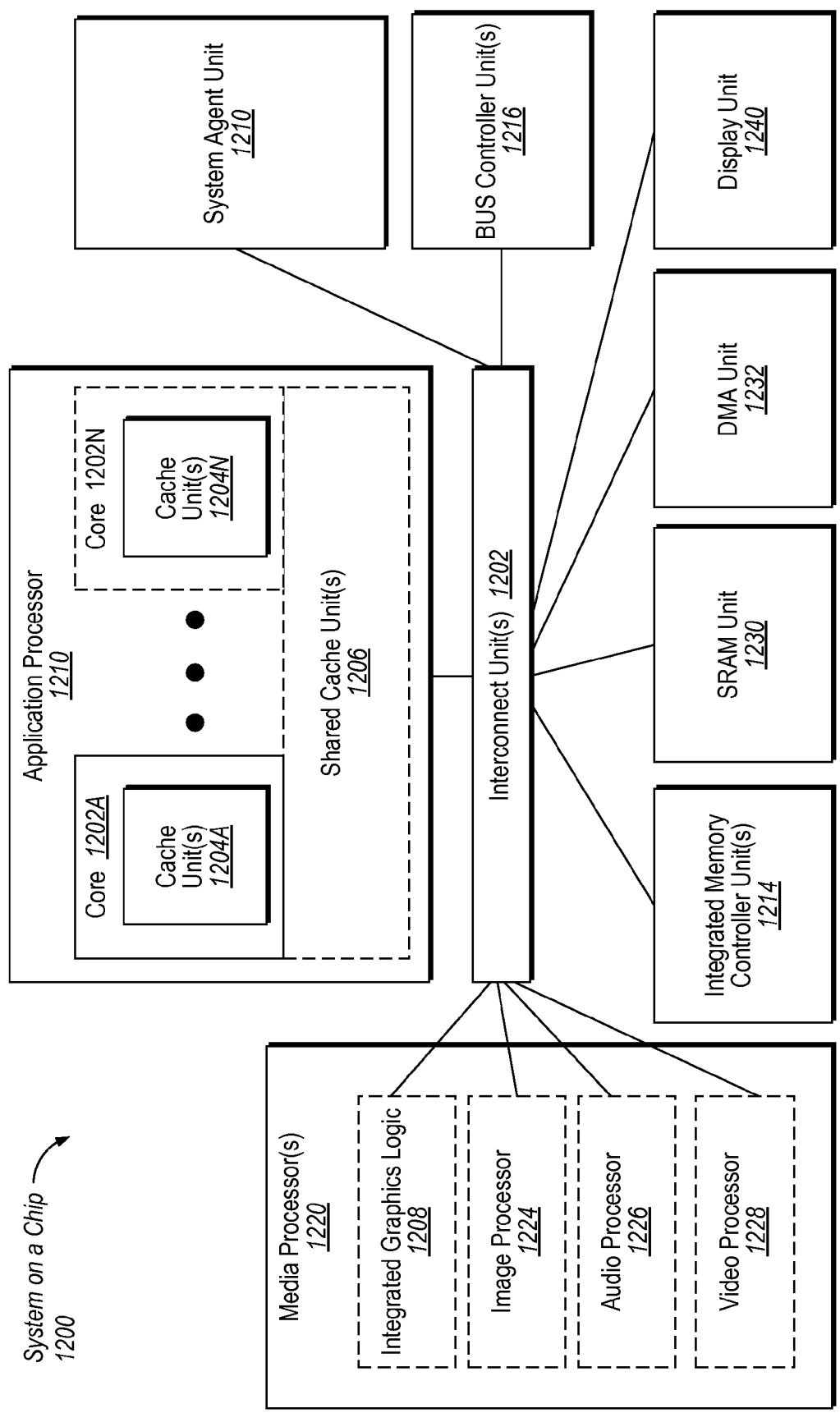
FIG. 12 depicts a block diagram of an example system on a chip (SoC) according to one implementation.

FIG. 12 depicts a block diagram of an example system on a chip (SoC) 1200 according to one implementation. The application processor 1210 provided by some version of processing system 100 capable of implementing virtual machine-based protected video paths, as described in more details herein above. As schematically illustrated by FIG. 12, interconnect unit(s) 1202 may be coupled to: an application processor 1210 which includes a set of one or more cores 1202A-N with corresponding cache units 1204A-N and shared cache unit(s) 1206; a system agent unit 1210; a bus controller unit(s) 1216; an integrated memory controller unit(s) 1214; a set or one or more media processors 1220 which may include integrated graphics logic 1208, an image processor 1224 for providing still and/or video camera functionality, an audio processor 1226 for providing hardware audio acceleration, and a video processor 1228 for providing video encode/decode acceleration; an static random access memory (SRAM) unit 1230; a direct memory access (DMA) unit 1232; and a display unit 1240 for coupling to one or more external displays.

Figure 13:
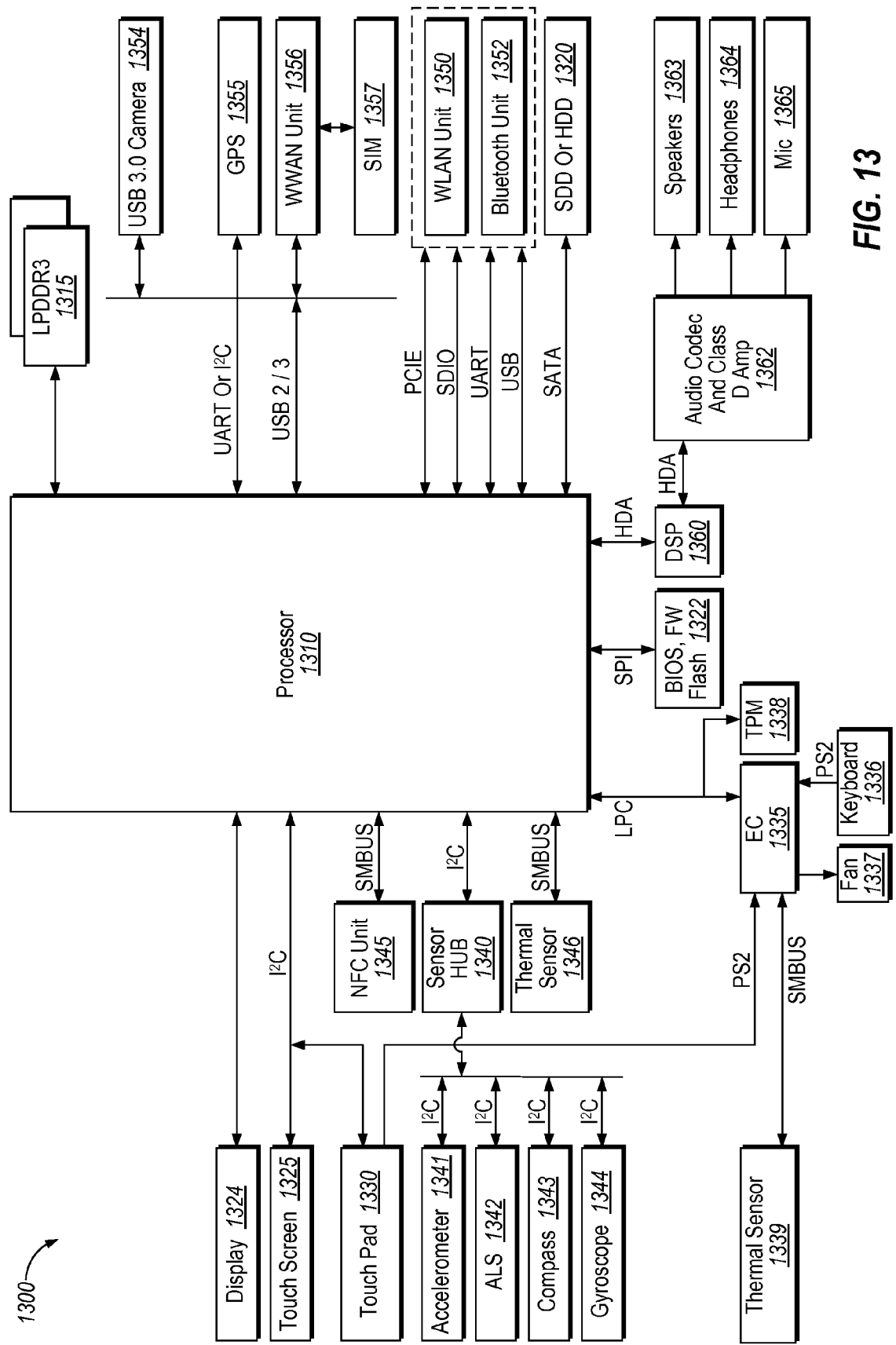
FIG. 13 depicts a block diagram of an example computer system according to one implementation.

FIG. 13 depicts a block diagram of an example computer system according to one implementation. Processor 1310 may be provided by some version of processing system 100 capable of implementing virtual machine-based protected video paths, as described in more details herein above.

The system 1300 schematically illustrated by FIG. 13 may include any combination of components implemented as ICs, portions thereof, discrete electronic devices, or other modules, logic, hardware, software, firmware, or a combination thereof adapted in a computer system, or as components otherwise incorporated within a chassis of the computer system. The block diagram of FIG. 13 is intended to show a high level view of many components of the computer system. However, it is to be understood that some of the components shown may be omitted, additional components may be present, and different arrangement of the components shown may occur in other implementations.

Processor 1310 may be provided by a microprocessor, multi-core processor, multithreaded processor, an ultra-low voltage processor, an embedded processor, or other known processing element. In the illustrated implementation, processor 1310 acts as a main processing unit and central hub for communication with many of the various components of the system 1300. As one example, processor 1300 may be implemented as a system on a chip (SoC). As a specific illustrative example, processor 1310 includes an Intel® Architecture Core™-based processor such as an i3, i5, i7 or another such processor available from Intel Corporation, Santa Clara, Calif.

Processor 1310 may communicate with a system memory 1315. In various implementations the individual memory devices may be of different package types such as single die package (SDP), dual die package (DDP) or quad die package (1P). These devices, in some implementations, may be directly soldered onto a motherboard to provide a lower profile solution, while in other implementations the devices may be configured as one or more memory modules that in turn couple to the motherboard by a given connector. Other memory implementations are possible, such as other types of memory modules, e.g., dual inline memory modules (DIMMs) of different varieties including but not limited to microDIMMs, MiniDIMMs. In one illustrative example, the memory may be sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1320 may be also coupled to processor 1310. In certain implementations, to enable a thinner and lighter system design as well as to improve system responsiveness, the mass storage 1320 may be implemented via a SSD. In other implementations, the mass storage may primarily be provided by a hard disk drive (HDD) with a smaller amount of SSD storage to act as a SSD cache to enable non-volatile storage of context state and other such information during power down events so that a fast power up can occur on re-initiation of system activities.

Also shown in FIG. 13, a flash device 1322 may be coupled to processor 1310, e.g., via a serial peripheral interface (SPI). The flash device 1322 may provide for non-volatile storage of system software, including basic input/output software (BIOS) as well as other firmware of the system.

In various implementations, the mass storage of the system may be provided by a SSD alone or as a disk, optical or other drive with an SSD cache. In some implementations, the mass storage may be provided by an SSD or as a HDD along with a restore (RST) cache module. The SSD cache may be configured as a single level cache (SLC) or multi-level cache (MLC) option to provide an appropriate level of responsiveness.

Various input/output (IO) devices may be present within system 1300, including, e.g., a display 1324 which may be provided by a high definition LCD or LED panel configured within a lid portion of the chassis. This display panel may also provide for a touch screen 1325 adapted externally over the display panel such that via a user's interaction with this touch screen, user inputs can be provided to the system to enable desired operations, e.g., with regard to the display of information, accessing of information and so forth. In certain implementations, display 1324 may be coupled to processor 1310 via a display interconnect that can be implemented as a high performance graphics interconnect. Touch screen 1325 may be coupled to processor 1310 via another interconnect, which in an embodiment can be an I2C interconnect. In addition to touch screen 1325, user input by way of touch can also occur via a touch pad 1330 which may be configured within the chassis and may also be coupled to the same I2C interconnect as touch screen 1325.

Various sensors may be present within the system and may be coupled to processor 1310 in different manners. Certain inertial and environmental sensors may couple to processor 1310 through a sensor hub 1340, e.g., via an I2C interconnect. These sensors may include an accelerometer 1341, an ambient light sensor (ALS) 1342, a compass 1343 and a gyroscope 1344. Other environmental sensors may include one or more thermal sensors 1346 which in some embodiments couple to processor 1310 via a system management bus (SMBus) bus. In certain implementations, one or more infrared or other heat sensing elements or any other element for sensing the presence or movement of a user may be present.

Various peripheral devices may couple to processor 1310 via a low pin count (LPC) interconnect. In certain implementations, various components can be coupled through an embedded controller 1335. Such components can include a keyboard 1336 (e.g., coupled via a PS2 interface), a fan 1337, and a thermal sensor 1339. In some embodiments, touch pad 1330 may also couple to EC 1335 via a PS2 interface. In addition, a security processor such as a trusted platform module (TPM) 1338 in accordance with the Trusted Computing Group (TCG) TPM Specification Version 1.2, dated Oct. 2, 2003, may also couple to processor 1310 via this LPC interconnect.

In certain implementations, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1300 can communicate with external devices in a variety of manners, including wirelessly. In the embodiment shown in FIG. 13, various wireless modules, each of which can correspond to a radio configured for a particular wireless communication protocol, are present. One manner for wireless communication in a short range such as a near field may be via a near field communication (NFC) unit 1345 which may communicate, in one embodiment with processor 1310 via an SMBus.

Additional wireless units can include other short range wireless engines including a WLAN unit 1350 and a Bluetooth unit 1352. Using WLAN unit 1350, Wi-Fi™ communications in accordance with a given Institute of Electrical and Electronics Engineers (IEEE) 802.11 standard can be realized, while via Bluetooth unit 1352, short range communications via a Bluetooth protocol can occur. These units may communicate with processor 1310 via, e.g., a USB link or a universal asynchronous receiver transmitter (UART) link. Or these units may couple to processor 1310 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1356 which in turn may couple to a subscriber identity module (SIM) 1357. In addition, to enable receipt and use of location information, a GPS module 1355 may also be present.

To provide for audio inputs and outputs, an audio processor can be implemented via a digital signal processor (DSP) 1360, which may couple to processor 1310 via a high definition audio (HDA) link. Similarly, DSP 1360 may communicate with an integrated coder/decoder (CODEC) and amplifier 1362 that in turn may couple to output speakers 1363 which may be implemented within the chassis. Similarly, amplifier and CODEC 1362 can be coupled to receive audio inputs from a microphone 1365.

Figure 14:
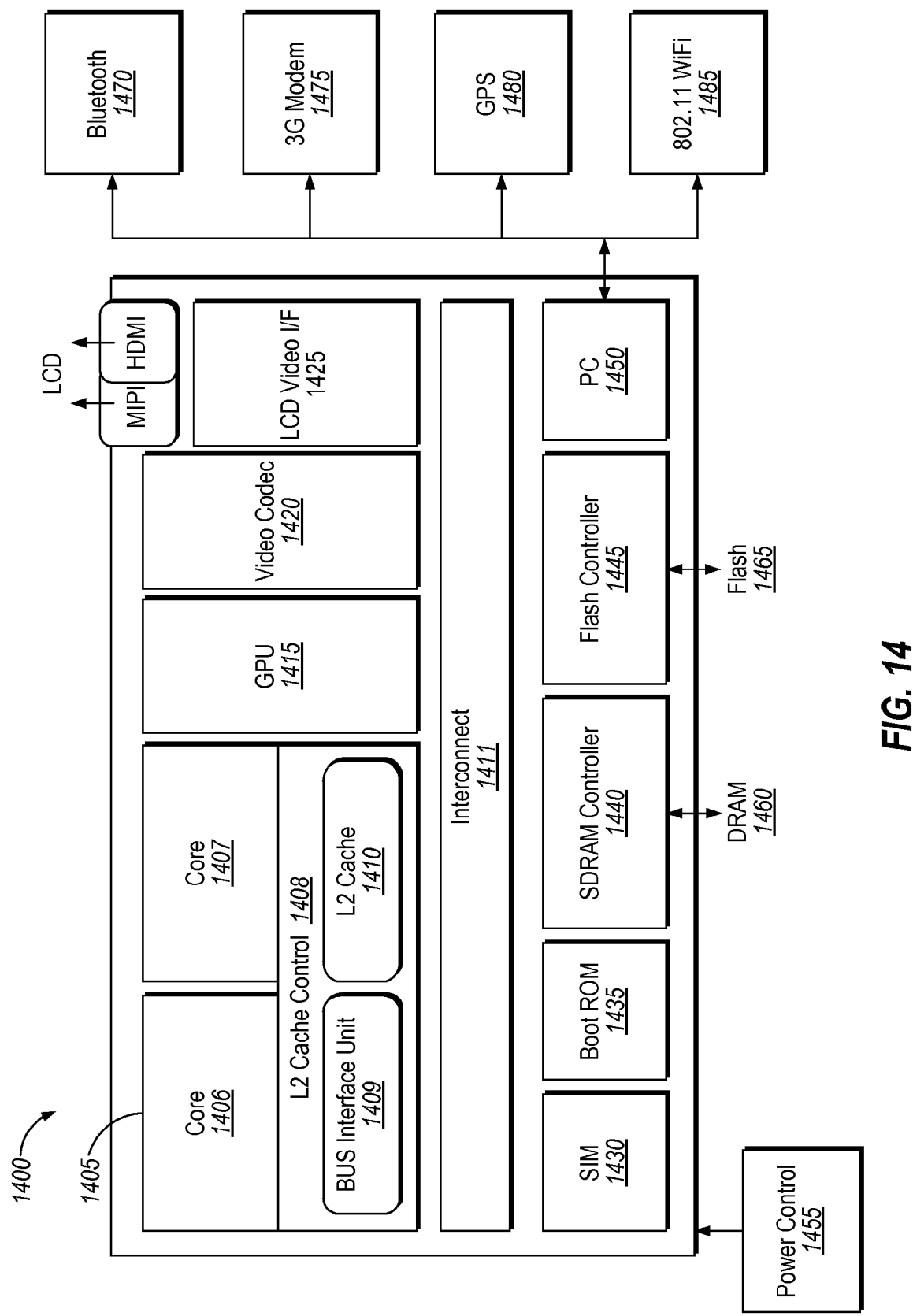
FIG. 14 depicts a block diagram of an example system on a chip (SoC) according to one implementation.

FIG. 14 depicts a block diagram of an example system on a chip (SoC according to one implementation. As a specific illustrative example, SOC 1400 may be included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

As schematically illustrated by FIG. 14, SOC 1400 may include two cores. Cores 1406 and 1407 may be coupled to cache control 1408 that is associated with bus interface unit 1409 and L2 cache 1410 to communicate with other parts of system 1400. Interconnect 1411 may include an on-chip interconnect, such as an IOSF, AMBA, or other interconnect.

Interconnect 1411 may provide communication channels to the other components, such as a Subscriber Identity Module (SIM) 1430 to interface with a SIM card, a boot ROM 1435 to hold boot code for execution by cores 1406 and 1407 to initialize and boot SOC 1400, a SDRAM controller 1440 to interface with external memory (e.g., DRAM 1460), a flash controller 1445 to interface with non-volatile memory (e.g., flash 1465), a peripheral control 1550 (e.g., Serial Peripheral Interface) to interface with peripherals, video codecs 1420 and Video interface 1425 to display and receive input (e.g., touch enabled input), GPU 1415 to perform graphics related computations, etc. In addition, the system may comprise peripherals for communication, such as a Bluetooth module 1470, 3G modem 1475, GPS 1480, and WiFi 1485.

Other computer system designs and configurations may also be suitable to implement the systems and methods described herein. The following examples illustrate various implementations in accordance with one or more aspects of the present disclosure.

Example 1 is a processing system, comprising: a processing core including a register to store an address of a memory corruption detection (MCD) table, wherein the processing core is to allocate a memory block of pre-determined size and to allocate a plurality of buffers within the memory block using a memory metadata word stored in an entry of the MCD table, wherein the memory metadata word comprises metadata to identify a first bit range within the memory block for a first buffer and a second bit range within the memory block for a second buffer.

Example 2 is the processing system of Example 1, wherein the processor core is to allocate the plurality of buffers by setting an indicator bit within the memory metadata word.

Example 3 is the processing system of any of Examples 1-2, wherein each of the plurality of buffers is protected by a corresponding unique MCD color code defined by the memory metadata word stored in the MCD table.

Example 4 is the processing system of any of Examples 1-3, wherein the processor core is to return a failure in response to a determination that an MCD color code of a pointer conflicts with a MCD color code corresponding to first buffer.

Example 5 is the processing system of any of Examples 1-4, wherein the processor core is to access the first buffer using the memory metadata word stored in the entry of the MCD table and to access the second buffer using the memory metadata word stored in the same entry of the MCD table.

Example 6 is the processing system of any of Examples 1-5, wherein the processing system comprises a system-on-a-chip (SoC).

Example 7 is the processing system of any of Examples 1-6, wherein the first buffer of the plurality of buffers is aligned to a first position within the memory block and the second buffer of the plurality of buffers is aligned to a second position within the memory block, wherein the first position is different from the second position.

Example 8 is the processing system of any of Examples 1-7, wherein the processing core is to change one or more portions of the memory metadata word corresponding to one or more of the plurality of buffers within the memory block in response to a deallocation request.

Various embodiments may have different combinations of the structural features described above. For instance, all optional features of the processors and methods described above may also be implemented with respect to a system described herein and specifics in the examples may be used anywhere in one or more embodiments.

Example 9 is a method comprising: allocating a first memory chunk within a memory block, the memory blocking having of pre-determined size; generating a memory corruption detection (MCD) metadata word associated with the first memory chunk; setting an indicator bit within the MCD metadata word to indicate a multiple chunk support state; setting a pointer color code associated with the first memory chunk; and verifying an access request to the first memory chunk by checking the pointer color code against the memory metadata word associated with the first memory chunk.

Example 10 is the method of Example 9, further comprising returning a failure in response to a determination that the pointer color code conflicts with a color code of the MCD metadata word.

Example 11 is the method of any of Examples 9-10, wherein the memory metadata word corresponds with the memory block.

Example 12 is the method of any of Examples 9-11, further comprising allocating a portion of memory to which to store an MCD table in response to a request to initialize the MCD table.

Example 13 is the method of any of Examples 9-12, further comprising allocating a second memory chunk, wherein the first memory chunk is aligned to a first position within the memory block and the second memory chunk is aligned to a second position within the memory block.

Example 14 is the method of any of Examples 9-13, wherein the memory metadata word comprises MCD values corresponding to both the first memory buffer and the second memory buffer.

Various embodiments may have different combinations of the structural features described above. For instance, all optional features of the processors and methods described above may also be implemented with respect to a system described herein and specifics in the examples may be used anywhere in one or more embodiments.

Example 15 is a computer-readable non-transitory storage medium comprising executable instructions that, when executed by a processor, cause the processor to: allocate a first memory chunk within a memory block of pre-determined size; initialize a memory corruption detection (MCD) table; generate a first MCD metadata word associated with the first memory chunk; set an indicator bit within the MCD metadata word to indicate a multiple chunk support state; initialize, based on the MCD metadata word, a first MCD table entry corresponding to the memory block; and generate a first pointer to reference the first memory chunk, wherein the pointer comprises a first bit sequence, derived from the MCD metadata word, within a pre-defined bit position of the first pointer associated with the first memory chunk.

Example 16 is the computer-readable non-transitory storage medium of Example 15, further comprising executable instructions that, when executed by a processor, cause the processor to: allocate a second memory chunk to the memory block; generate a second MCD value corresponding to the second memory chunk; and initialize a second MCD table entry corresponding to the memory block, wherein the second MCD table entry is based on the second MCD value; update the MCD metadata word attached to the memory block to correspond with the second memory chunk; and generate a second pointer to reference the second memory chunk, wherein the second pointer comprises a second bit sequence associating the second pointer with the second memory chunk.

Example 17 is the computer-readable non-transitory storage medium of Examples 15-16, wherein the first memory chunk is aligned to a first position within the memory block and the second memory chunk is aligned to a second position within the memory block.

Example 18 is the computer-readable non-transitory storage medium of Examples 15-17, further comprising executable instructions that, when executed by a processor, cause the processor to validate an application pointer generated by a first memory chunk access request of an application by comparing with the application pointer with the first MCD value stored in the MDC table.

Example 19 is the computer-readable non-transitory storage medium of Examples 15-18, further comprising executable instructions that, when executed by a processor, cause the processor to return a failure in response to a determination that the application pointer conflicts with the MCD table entry corresponding to the first memory chunk.

Example 20 is the computer-readable non-transitory storage medium of Examples 15-19: further comprising executable instructions that, when executed by a processor, cause the processor to change one or more portions of the MCD metadata word attached to the memory block in response to a deallocation request.

Various embodiments may have different combinations of the structural features described above. For instance, all optional features of the processors and methods described above may also be implemented with respect to a system described herein and specifics in the examples may be used anywhere in one or more embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to employing error correcting code to carry additional bits in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor system comprising:
   a processor core comprising a register to store an address of a memory corruption detection (MCD) table,
   wherein the processor core is to allocate a memory block of pre-determined size and to allocate a plurality of buffers within the memory block using a memory metadata word stored in an entry of the MCD table, wherein the memory metadata word comprises metadata to identify a first bit range within the memory block for a first buffer and a second bit range within the memory block for a second buffer.

2. The processing system of claim 1, wherein the processor core is to allocate the plurality of buffers by setting an indicator bit within the memory metadata word.

3. The processing system of claim 1, wherein each of the plurality of buffers is protected by a corresponding unique MCD color code defined by the memory metadata word stored in the MCD table.

4. The processing system of claim 3, wherein the processor core is to return a failure in response to a determination that an MCD color code of a pointer conflicts with a MCD color code corresponding to first buffer.

5. The processing system of claim 1, wherein the processor core is to access the first buffer using the memory metadata word stored in the entry of the MCD table and to access the second buffer using the memory metadata word stored in the same entry of the MCD table.

6. The processing system of claim 1, wherein the processing system comprises a system-on-a-chip (SoC).

7. The processing system of claim 1, wherein the first buffer of the plurality of buffers is aligned to a first position within the memory block and the second buffer of the plurality of buffers is aligned to a second position within the memory block, wherein the first position is different from the second position.

8. The processing system of claim 1, wherein the processor core is to change one or more portions of the memory metadata word corresponding to one or more of the plurality of buffers within the memory block in response to a deallocation request.

9. A method comprising:
   allocating a first memory chunk within a memory block, the memory blocking having of pre-determined size;
   generating a memory corruption detection (MCD) metadata word associated with the first memory chunk;
   setting an indicator bit within the MCD metadata word to indicate a multiple chunk support state;
   setting a pointer color code associated with the first memory chunk; and
   verifying an access request to the first memory chunk by checking the pointer color code against the memory metadata word associated with the first memory chunk.

10. The method of claim 9, further comprising returning a failure in response to a determination that the pointer color code conflicts with a color code of the MCD metadata word.

11. The method of claim 9, wherein the memory metadata word corresponds with the memory block.

12. The method of claim 9, further comprising allocating a portion of memory to which to store an MCD table in response to a request to initialize the MCD table.

13. The method of claim 9, further comprising allocating a second memory chunk, wherein the first memory chunk is aligned to a first position within the memory block and the second memory chunk is aligned to a second position within the memory block.

14. The method of claim 13, wherein the memory metadata word comprises MCD values corresponding to both the first memory buffer and the second memory buffer.

15. A computer-readable non-transitory storage medium comprising executable instructions that, when executed by a processor, cause the processor to:
 allocate a first memory chunk within a memory block of pre-determined size;
 initialize a memory corruption detection (MCD) table;
 generate a first MCD metadata word associated with the first memory chunk;
 set an indicator bit within the MCD metadata word to indicate a multiple chunk support state;
 initialize, based on the MCD metadata word, a first MCD table entry corresponding to the memory block; and
 generate a first pointer to reference the first memory chunk, wherein the pointer comprises a first bit sequence, derived from the MCD metadata word, within a pre-defined bit position of the first pointer associated with the first memory chunk.

16. The computer-readable non-transitory storage medium of claim 15, further comprising executable instructions that, when executed by the processor, cause the processor to:
 allocate a second memory chunk to the memory block;
 generate a second MCD value corresponding to the second memory chunk;
 initialize a second MCD table entry corresponding to the memory block, wherein the second MCD table entry is based on the second MCD value;
 update the MCD metadata word attached to the memory block to correspond with the second memory chunk; and
 generate a second pointer to reference the second memory chunk, wherein the second pointer comprises a second bit sequence associating the second pointer with the second memory chunk.

17. The computer-readable non-transitory storage medium of claim 16, wherein the first memory chunk is aligned to a first position within the memory block and the second memory chunk is aligned to a second position within the memory block.

18. The computer-readable non-transitory storage medium of claim 15, further comprising executable instructions that, when executed by the processor, cause the processor to validate an application pointer generated by a first memory chunk access request of an application by comparing with the application pointer with the first MCD value stored in the MDC table.

19. The computer-readable non-transitory storage medium of claim 17, further comprising executable instructions that, when executed by the processor, cause the processor to return a failure in response to a determination that the first pointer conflicts with the MCD table entry corresponding to the first memory chunk.

20. The computer-readable non-transitory storage medium of claim 15, further comprising executable instructions that, when executed by the processor, cause the processor to change one or more portions of the MCD metadata word attached to the memory block in response to a deallocation request.

* * * * *